L. S. GRAVES.
BUFFING-ROLL FOR THE SOLES OF BOOTS AND SHOES.

No. 186,205.  Patented Jan. 16, 1877.

Witnesses.
J. M. Howe
Peter Dix

Inventor.
L. S. Graves.
By Fred. Loughborough
Atty.

UNITED STATES PATENT OFFICE.

LORENZO S. GRAVES, OF ROCHESTER, NEW YORK.

IMPROVEMENT IN BUFFING-ROLLS FOR THE SOLES OF BOOTS AND SHOES.

Specification forming part of Letters Patent No. 186,205, dated January 16, 1877; application filed June 21, 1876.

*To all whom it may concern:*

Be it known that I, LORENZO S. GRAVES, of Rochester, in the county of Monroe and State of New York, have invented certain new and useful Improvements in Buffing-Rollers for Shoemakers; and I do hereby declare that the following is a full, clear, and exact description thereof, reference being had to the accompanying drawings, making part of this specification, in which—

Figure 1:
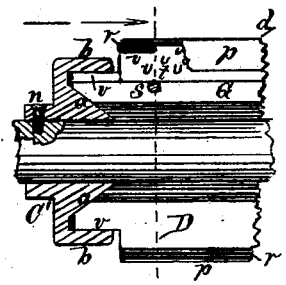
Figure 3:
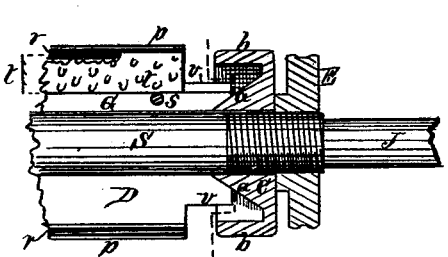
Figure 2:
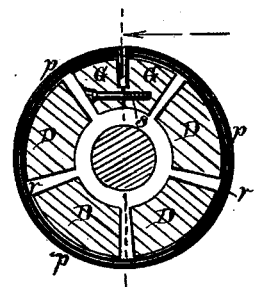
Figure 4:
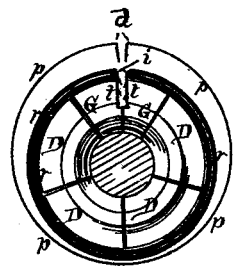

Figures 1 and 3 are longitudinal sections of opposite ends of the built-up roller, being shown expanded in the former, and in the latter collapsed, both views shown looking in the direction of the arrow in Fig. 2. Fig. 2 is a transverse section in the plane indicated by the dotted line in Fig. 1, showing the parts expanded ready for use. Fig. 4 is an end view of the roller, with the expanding collar C and the nut removed, as indicated by the dotted line in Fig. 3, looking toward the left, the parts not being expanded.

The object of this invention is to provide a cushioned buffing-roller for shoemakers, to and from which the sand-paper may be readily applied or detached; and it consists in the employment of an expansive roller of peculiar construction.

I employ a shaft, S, preferably of a suitable length to carry two lengths of the built-up rollers. Each roller should have a sand-paper surface of nine inches in length, and should be large enough to afford about ten inches in circumference for the sand-paper when the roller is fully expanded. This requires a nine-by-eleven-inch sheet of sand-paper; but of course the rollers may be made to receive either larger or smaller ones. For a single roller the fixed head or collar C' may be secured to the shaft S by the screw $n$, and when a double roller is used the nuts E should be on the opposite ends of the shaft. This collar and the collar C are formed exactly alike, except the projecting hub of the former, through which the screw $n$ passes. They have a conical center, as represented by the inclined lines $a$, Figs. 1 and 3, and a projecting rim, $b$. The collar C is fitted to slide freely upon the shaft. The latter is threaded at that end, from the shoulder of the journal, an inch and a half or two inches, to receive the "milled" nut E.

Each end of the staves D is beveled to correspond with the inclination of the cone-shaped formation of the collars C and C', as shown in Figs. 1 and 3. The hollow cone formed by the ends of the united staves is also shown in Fig. 4. The staves may be made wider or narrower by using a less or greater number; but I prefer five.

One stave should be divided longitudinally into equal sections G, Figs. 2 and 4, and a space formed between the outer portion of their contiguous faces. I provide each half of this divided stave with a thin metallic plate, $t$. They are provided with one or more rows of oblique punctures, as seen in Figs. 1, 2, and 3, the plates being attached to the staves with the points formed by the punctures hanging inward or toward the center of the roller. These plates should project beyond the circumferential face of the stave nearly as far as the two thicknesses of the elastic band or cushion $r$. The two halves G of this stave are firmly united by several screws, $s$, Figs. 1, 2, and 3.

The space between the plates $t$ should be just sufficient to permit the two folded edges $u$ of the sand-paper sheet to be pressed in between them while the roller is in its collapsed condition.

The staves D may be made of wood or other suitable material, and their ends, when formed into the cylinder, are reduced or turned down, as seen in Figs. 1, 3, and 4, so that when the roller is expanded the face $v$ of the staves is forced against the under face of the flange $b$ of the collars, as shown in Fig. 1, which limits the expanded diameter of the roller.

The elastic band or cushion $r$ I make of two thicknesses of ordinary rubber-shirred goods, such as is employed in the manufacture of elastic gaiters. This should be wide enough to cover the whole length of the working-face of the roller. The length of the band, when in its normal condition, should be sufficient to reach around the staves when they are resting against the shaft, as shown in Figs. 3 and 4; and the folded edges at $i$ are nailed one to each of the halves G of the divided stave, and against the plates $t$. Soft-rubber packing or thick soft felting might answer for this cushion just as well. The staves D may all be secured to the band $r$, if desired.

It will be seen that the elastic band, besides forming a cushioned bed for the sand-paper hoop, also acts as a support across the space between the staves when the roller is expanded.

What I claim as my invention is—

1. A buffing-roller composed of a series of staves made diametrically expansive by means of conical collars forced under their ends, one collar being fixed, and the other adjustable upon the shaft, in the manner and for the purposes set forth.

2. The shaft S and collars C C', in combination with cylindrically-expansive staves D G, elastic cushion $r$, and buffer-band $p$, all operating conjointly in the manner and for the purposes set forth.

3. The combination, with the staves D, of buffing-rollers, the collars C C', provided with a flange or rim, $b$, and conical center $a$, substantially as and for the purposes set forth.

L. S. GRAVES.

Witnesses:
F. H. KEITH,
E. CARPENTER.